United States Patent

Evans

[15] 3,665,026
[45] May 23, 1972

[54] IMIDATOSILANES

[72] Inventor: Milton L. Evans, Schenectady, N.Y.
[73] Assignee: General Electric Company
[22] Filed: Mar. 14, 1969
[21] Appl. No.: 807,436

[52] U.S. Cl....................260/448.8 R, 260/448.2 N, 260/25
[51] Int. Cl..........................................C07f 7/02, C07f 7/04
[58] Field of Search............................260/448.2 N, 448.8 R

[56] References Cited

UNITED STATES PATENTS

| | | | |
|---|---|---|---|
| 2,876,209 | 3/1959 | Benneville et al............... | 260/448.2 N |
| 2,876,234 | 3/1959 | Hurwitz et al................... | 260/448.2 N |
| 3,488,371 | 1/1970 | Klebe.............................. | 260/448.2 N |

*Primary Examiner*—Tobias E. Levow
*Assistant Examiner*—Werten F. W. Bellamy
*Attorney*—Donavon L. Favre, Frank L. Neuhauser and Oscar B. Waddell

[57] ABSTRACT

Compound of the formula:

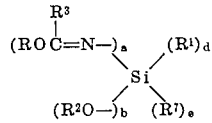

wherein $R^1$ and $R^7$ are each organic radicals of not more than 18 carbon atoms selected from the group consisting of hydrogen, hydrocarbyl, halohydrocarbyl and cyanoalkyl. R and $R^2$ are each organic radicals of not more than 18 carbon atoms selected from the group consisting of hydrocarbyl, halohydrocarbyl, nitrohydrocarbyl and alkoxyhydrocarbyl. $R^3$ is an organic radical of not more than 18 carbon atoms selected from the group consisting of hydrogen, hydrocarbyl, halohydrocarbyl, nitrohydrocarbyl, alkoxyhydrocarbyl, dialkylamino and

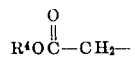

wherein $R^4$ is an organic radical selected from the group consisting of aliphatic hydrocarbyl, aliphatic halohydrocarbyl, aliphatic nitrohydrocarbyl, and

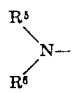

wherein $R^5$ and $R^6$ are each aliphatic hydrocarbyl. $a$ is an integer of 1 to 4, inclusive, $b$ is an integer of 0 to 3, inclusive, $d$ and $e$ are each integers of 0 to 1, and the sum of $a$, $b$, $d$ and $e$ is 4. The imidatosilanes are useful as chain extenders and as curing agents in one-package RTV compositions.

16 Claims, No Drawings

IMIDATOSILANES

This invention relates to imidatosilanes and methods for their preparation. The imidatosilanes of this invention are useful in the preparation of one-package room temperature vulcanizing (RTV) compositions, as chain extenders for silanol-stopped polydiorganosiloxanes and as plasticizers for RTV compositions.

The imidatosilanes of this invention are represented by the formula:

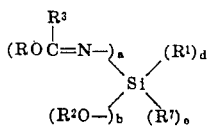

wherein $R^1$ and $R^7$ are each organic radicals of not more than 18 carbon atoms selected from the group consisting of hydrogen, hydrocarbyl, halohydrocarbyl and cyanoalkyl, R and $R^2$ are each organic radicals of not more than 18 carbon atoms selected from the group consisting of hydrocarbyl, halohydrocarbyl, nitrohydrocarbyl and alkoxyhydrocarbyl, $R^3$ is an organic radical of not more than 18 carbon atoms selected from the group consisting of hydrogen, hydrocarbyl, halohydrocarbyl, nitrohydrocarbyl, alkoxyhydrocarbyl, dialkylamino and

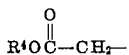

wherein $R^4$ is an organic radical selected from the group consisting of aliphatic hydrocarbyl, aliphatic halohydrocarbyl, aliphatic nitrohydrocarbyl, and

wherein $R^5$ and $R^6$ are each aliphatic hydrocarbyl, $a$ is an integer of 1 to 4, inclusive, $b$ is an integer of 0 to 3, inclusive, $d$ and $e$ are each integers of 0 or 1, and the sum of $a$, $b$, $d$ and $e$ is 4.

The term hydrocarbyl as used herein means a hydrocarbon from which one hydrogen atom has been removed, i.e., a monovalent hydrocarbon.

In the above formula, preferably, $R^1$ and $R^7$ are H, phenyl or alkyl of not more than 4 carbon atoms, R and $R^2$ are phenyl or alkyl or allyl or alkoxyalkyl of not more than 8 carbon atoms and $R^3$ is phenyl or alkyl of not more than 4 carbon atoms.

In the above formula, R and $R^2$ can be, for example, mononuclear and binuclear aryl, such as phenyl, naphthyl, benzyl, tolyl, xylyl, 2,6-di-t-butylphenyl, 4-butylphenyl, 2,4,6-trimethylphenyl, biphenyl and ethylphenyl; halogen-substituted mononuclear and binuclear aryl such as 2,6-dichlorophenyl, 4-bromophenyl, 2,5-difluorophenyl, 4,4'-dichlorobiphenyl, 2'-chloronaphthyl, 2,4,6-trichlorophenyl and 2,5-dibromophenyl; nitro-substituted mononuclear and binuclear aryl such as 4-nitrophenyl and 2,6-dinitrophenyl; alkoxy-substituted mono and binuclear aryl such as 4-methoxyphenyl, 2,6-dimethoxyphenyl, 4-t-butoxyphenyl, 2-ethoxyphenyl, 2-ethoxynaphthyl and 2,4,6-trimethoxyphenyl; alkyl such as methyl, ethyl, n-propyl, isopropyl, n-butyl, sec-butyl, isobutyl, tert-butyl, amyl, hexyl, heptyl, octyl, nonyl, decyl, dodecyl and the various homologs and isomers of alkyl of not more than 18 carbon atoms, alkenyl such as vinyl, allyl, n-butenyl-1, n-butenyl-2, n-pentenyl-2, n-hexenyl-2, 2,3-dimethylbutenyl-2, n-heptenyl, n-decenyl, n-dodecenyl and the various homologs and isomers of alkenyl of not more than 18 carbon atoms; alkynyl such as propargyl, 2-butynyl and the various homologs and isomers of alkynyl of not more than 18 carbon atoms; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, bromohexyl, 2,4-dichlorohexyl, 1,3-dibromohexyl, 1,3,4-trichlorohexyl, chloroheptyl, bromoheptyl, fluoro-heptyl, 1,3-dichloroheptyl, 1,4,4-trichloroheptyl, 2,4-dichloromethylheptyl, chlorooctyl, bromooctyl, iodooctyl, 2,4-dichloromethylhexyl, 2,4-dichlorooctyl, 2,4,4-trichloromethylpentyl, 1,3,5-tribromooctyl and the various homologs and isomers of haloalkyl of not more than 18 carbon atoms; haloalkenyl such as chlorovinyl, bromovinyl, chloroallyl, bromoallyl, 3-chloro-n-butenyl-1, 3-chloro-n-pentenyl-1, 3-fluoro-n-heptenyl-1, 1,3,3-trichloro-n-heptenyl-5, 1,3,5-trichloro-n-octenyl-6, 2,3,3-trichloromethylpentenyl-4 and the various homologs and isomers of haloalkenyl of not more than 18 carbon atoms; haloalkynyl such as chloropropargyl, bromopropargyl and the various homologs and isomers of haloalkynyl of not more than 18 carbon atoms; nitroalkyl such as nitromethyl, nitroethyl, nitro-n-propyl, nitro-n-butyl, nitropentyl, 1,3-dinitroheptyl and the homologs and isomers of nitroalkyl of not more than 18 carbon atoms; nitroalkenyl such as nitroallyl, 3-nitro-n-butenyl-1, 3-nitro-n-heptenyl-1 and the various homologs and isomers of nitroalkenyl of not more than 18 carbon atoms; nitroalkynyl such as nitropropargyl and the various homologs and isomers of nitroalkynyl of not more than 18 carbon atoms; alkoxyalkyl and polyalkoxyalkyl such as methoxymethyl, ethoxymethyl, butoxymethyl, methoxyethyl, ethoxyethyl, ethoxyethoxyethyl, methoxyethoxymethyl, butoxymethoxyethyl, ethoxybutoxyethyl, methoxypropyl, butoxypropyl, methoxybutyl, butoxybutyl, methoxypentyl, butoxypentyl, methoxymethoxypentyl, butoxyhexyl, methoxyheptyl, ethoxyethoxy and the various homologs and isomers of alkoxyalkyl and polyalkoxyalkyl of not more than 18 carbon atoms; alkoxyalkenyl and polyalkoxyalkenyl such as ethoxyvinyl, methoxyallyl, butoxyallyl, methoxy-n-butenyl-1, butoxy-n-pentenyl-1, methoxyethoxy-n-heptenyl-1, and the various homologs and isomers of alkoxyalkenyl and polyalkoxyalkenyl of not more than 18 carbon atoms; alkoxyalkynyl and polyalkoxyalkynyl such as methoxypropargyl and the various homologs and isomers of alkoxyalkynyl and polyalkoxyalkynyl of not more than 18 carbon atoms; cycloalkyl, cycloalkenyl and alkyl, halogen, alkoxy and nitro-substituted cycloalkyl and cycloalkenyl such as cyclopentyl, cyclohexyl, cycloheptyl, cyclooctyl, cyclononyl, 6-methylcyclohexyl, 2,5-dimethylcycloheptyl, 4-butylcyclopentyl, 3,4-dichlorocyclohexyl, 2,6-dibromocycloheptyl, 6-methoxycyclooctyl, 2-nitrocyclopentyl, 1-cyclopentenyl, 3-methyl-1-cyclopentenyl, 5-methoxy-1-cyclopentenyl, 3,4-dimethyl-1-cyclopentenyl, 2,5-dimethoxy-1-cyclopentenyl, 5-methyl-5-cyclopentenyl, 3,4-dichloro-5-cyclopentenyl, 5-(tert-butyl)-1-cyclopentenyl, 2-nitro-1-cyclohexenyl, 1-cyclohexenyl, 3-methyl-1-cyclohexenyl, 3,4-dimethyl-1-cyclohexenyl, 6-methoxy-1-cyclohexenyl and the like.

In the above formula, the hydrocarbyl and substituted hydrocarbyl of $R^3$, $R^4$, $R^5$ and $R^6$ can be those listed above for R and $R^2$.

In the above formula, $R^1$ and $R^7$ can be hydrogen, hydrocarbyl and halohydrocarbyl such as those listed above for R and $R^2$, and cyanoalkyl such as cyanomethyl, cyanoethyl, cyanobutyl, cyanoisobutyl and the various isomers and homologs of cyanoalkyl of not more than 18 carbon atoms.

The imidatosilanes of this invention are prepared by a process which comprises reacting an organic compound selected from the group consisting of (1) an imidate and (2) a mixture of an imidate and an alcohol with a silane of the formula:

in the presence of an acid acceptor. The process of this invention can be represented by the following synthesis:

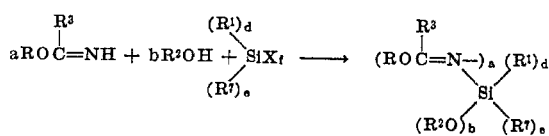

wherein R, R¹, R², R³, R⁷, a, b, d and e are as defined above, X is halogen (Cl, Br, F or I) and f is an integer from 2 to 4, inclusive. In carrying out the process of this invention, the organic compound and the silane can be added separately or concomitantly to the reaction vessel in the required amounts or a molar excess of either reactant can be used. If excess reactant is employed, it is preferred that it be the organic compound since it will serve as a reaction medium and is easily separated from the product. Temperature of reaction for the process of this invention is not critical and good results can generally be obtained at a temperature from about 0° C to about 100° C. Temperatures from about 25° C to about 80° C are preferred.

The process is preferably carried out in the presence of an inert organic medium. The organic medium which can be employed in the process of this invention can be any of the well known solvents and diluents which are inert to the reactants. For example, aromatic hydrocarbons, such as benzene, toluene and xylene; ethers such as diethyl ether, dibutyl ether, bis-(2-methoxyethyl)-ether and tetrahydrofuran; cyclic hydrocarbons, such as cyclohexane; nitriles such as acetonitrile and amides such as dimethylacetamide.

The separation of the product from the reaction mixture is readily accomplished by conventional means well known in the art. For example filtration, fractional distillation under reduced pressure, selective extraction, fractional distillation using a carrier gas, film distribution, elution or any appropriate combination of these methods are suitable.

Pressure is not a critical factor in the process of this invention. Pressure both above and below atmospheric pressure can be employed, although atmospheric pressure is preferred for convenience.

Acid acceptors which can be used in the process of this invention include the following representative materials. Inorganic bases, for example, alkali-metal hydroxides such as lithium hydroxide, sodium hydroxide, potassium hydroxide, rubidium hydroxide and cesium hydroxide; alkaline earth metal hydroxides such as calcium hydroxide and barium hydroxide; alkali-metal hydrides such as sodium hydride, potassium hydride and lithium hydride; metallic oxides such as calcium oxide, magnesium oxide, silver oxide and barium oxide; alkali-metal and alkaline earth metal carbonates such as sodium carbonate, potassium carbonate, magnesium carbonate, calcium carbonate and barium carbonate, and ammonia and ammonia producing compounds such as ammonium hydroxide and ammonium carbonate; and organic bases, for example, aliphatic and aromatic alkoxides such as sodium methoxide, potassium methoxide, lithium methoxide, sodium ethoxide, potassium ethoxide, lithium butoxide, sodium butoxide, sodium phenoxide, lithium phenoxide and potassium phenoxide; tertiary amines such as trimethylamine, triethylamine, tri-n-propylamine, triisopropylamine, tri-n-butylamine, triisobutylamine, tri-sec-butylamine, tri-n-amylamine, triisoamylamine, trihexylamine, triheptylamine and trioctylamine; other tertiary amines such as pyridine and mercaptides such as sodium methylmercaptide, sodium ethylmercaptide, potassium methylmercaptide and potassium phenylmercaptide.

The following examples will illustrate the invention. Parts and per cents are by weight unless otherwise indicated.

EXAMPLE 1

A suitable reaction vessel is charged with about 70 parts of benzene, 25 parts of methyltrichlorosilane and 44 parts of ethylacetimidate dissolved in 51 parts of triethylamine. The mixture is heated at reflux with stirring for about 2 hours. At the end of this time the amine hydrochloride is removed by filtration and the filtrate is concentrated by evaporation of the benzene. The concentrate is filtered to give 35 parts of methyl-tris-(ethylacetimidato)-silane, a liquid having a b.p. of 132° to 134° C at a pressure of 0.6 mm of mercury. The product imidatosilane is confirmed by nuclear magnetic resonance (NMR) and infrared analysis (IR).

Following substantially the same procedure as in the foregoing example and using the appropriate reactants, the following compounds of this invention are prepared.

EXAMPLE

COMPOUND

2. Methyl-tris(ethyldimethylcyanimidato)silane.
3. Methyl-tris(ethyldiethylcyanimidato)silane.
4. Methyl-tris(ethyldiethylcyanimidato)silane.
5. Phenyl-tris(ethyldiethylcyanimidato)silane.
6. Phenyl-tris(ethyldimethylcyanimidato)silane.
7. Ethyl-tris(ethyldimethylcyanimidato)silane.
8. n-Propyl-tris(ethyldimethylcyanimidato)silane.
9. Methyl-tris(isopropylpropionimidato)silane.
10. Methyl-tris(ethylpropionimidato)silane.
11. Phenyl-tris(ethylpropionimidato)silane.
12. Phenyl-tris(n-butylpropionimidato)silane.
13. Phenyl-tris(chloromethylpropionimidato)silane.
14. Phenyl-tris(phenylpropionimidato)silane.
15. Phenyl-tris(2-chlorophenylpropionimidato)silane.
16. Methyl-tris(ethylacetimidato)silane.
17. tris(ethylacetimidato)silane.
18. Methyl-tris(n-butylacetimidato)silane.
19. Methoxy-tris(phenylacetimidato)silane.
20. Butoxy-tris(ethylacetimidato)silane.
21. Butoxy-tris(n-propylacetimidato)silane.
22. Phenyl-tris(ethylacetimidato)silane.
23. Phenyl-tris(propylacetimidato)silane.
24. tetra-(ethylacetimidato)silane.

EXAMPLE 25

A suitable reaction vessel is charged with about 375 parts of benzene, 149 parts of methyltrichlorosilane, 46 parts of ethyl alcohol and 174 parts of ethyl acetimidate dissolved in 303 parts of triethylamine. The reaction mixture is heated at reflux with stirring for about 2 hours. At the end of this time the amine hydrochloride is removed by filtration and the filtrate concentrated by evaporation of the benzene. The concentrate is filtered to give 172 parts of methyl(ethoxy)-bis-(ethylacetimidato)silane, a liquid having a b.p. of 85° to 86° C at a pressure of 0.6 mm of mercury. The product imidatosilane is confirmed by IR.

EXAMPLE 26

A suitable reaction vessel is charged with about 330 parts of benzene, 149 parts of methyltrichlorosilane, 92 parts of ethyl alcohol and 87 parts of ethyl acetimidate dissolved in 303 parts of triethylamine. The reaction mixture is heated at reflux with stirring for about 2 hours. At the end of this time the HCl is removed by filtration and the filtrate concentrated by evaporation of the benzene. The concentrate is filtered to give 110 parts of methyl-(diethoxy)(ethylacetimidato)silane, a liquid having a b.p. of 60° to 65° C at a pressure of 0.6 mm of mercury. The product imidatosilane is confirmed by IR.

Following substantially the same procedure as in Examples 25 and 26 and using the appropriate reactants, the following compounds of this invention are prepared.

EXAMPLE

COMPOUND

27. Methoxy(t-butoxy)-bis(phenylpropionimidato)silane.

28. Methyl(ethoxy)-bis(methylpropionimidato)silane.
29. Methyl(methoxy)-bis(ethylpropionimidato)silane.
30. Methyl(n-butoxy)-bis(ethylpropionimidato)silane.
31. Methyl(t-butoxy)-bis(phenylpropionimidato)silane.
32. Methyl(t-butoxy)-bis(ethylacetimidato)silane.
33. Phenyl(t-butoxy)-bis(ethylacetimidato)silane.
34. Ethyl(t-butoxy)-bis(ethylacetimidato)silane.
35. Phenyl(methoxy)-bis(propylacetimidato)silane.
36. Phenyl(ethoxy)-bis(ethylacetimidato)silane.
37. t-Butyl(ethoxy)-bis(ethylacetimidato)silane.
38. Methoxy(methoxy)-bis(ethylacetimidato)silane.
39. Methyl(methoxy)-bis(ethylacetimidato)silane.
40. Phenyl(methoxy)-bis(ethylacetimidato)silane.
41. Methyl(dimethoxy)(ethylacetimidato)silane.
42. Methoxy(diethoxy)(ethylacetimidato)silane.
43. Methoxy(diethoxy)(ethylacetimidato)silane.
44. Methoxy(di-t-butoxy)(ethylacetimidato)silane.
45. Phenyl(di-t-butoxy)(ethylacetimidato)silane.
46. Phenyl(dimethoxy)(ethylacetimidato)silane.
47. Phenyl(diphenoxy)(ethylacetimidato)silane.
48. Methyl(dimethoxy)(phenylpropionimidato)silane.
49. Methyl(diphenoxy)(methylpropionimidato)silane.

The imidatosilanes of the above formula wherein *d* and/or *e* are zero are useful in the preparation of room temperature vulcanizing compositions which are stable under substantially anhydrous conditions and which cure to the solid, elastic state upon exposure to moisture.

The RTV compositions comprise an admixture of one or more imidatosilanes of the above formula wherein *d* and/or *e* are zero and a silanol chain-stopped polydiorganosiloxane represented by the formula

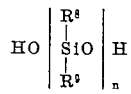

wherein $R^8$ and $R^9$ are each organic radicals of not more than 18 carbon atoms selected from the group consisting of hydrocarbyl, halohydrocarbyl and cyanoalkyl, and $n$ is an integer of at least 5 and is generally from about 10 to about 15,000 or more.

The silanol chain-stopped polydiorganosiloxanes are well known in the art and include compositions containing different $R^8$ and $R^9$ groups. For example, the $R^8$ groups can be methyl, while the $R^9$ groups can be phenyl and/or beta-cyanoethyl. Furthermore, within the scope of the polydiorganosiloxanes which can be employed are copolymers of various types of diorganosiloxane units, such as silanol chain-stopped copolymers of dimethylsiloxane units, diphenylsiloxane units and methylphenylsiloxane units or, for example, copolymers of dimethylsiloxane units, methylphenylsiloxane units and methylvinylsiloxane units. It is preferred that at least 50 percent of the $R^8$ and $R^9$ groups of the silanol chain-stopped polydiorganosiloxanes be methyl groups. A mixture of various silanol chain-stopped polydiorganosiloxanes also can be employed. The silanol chain-stopped materials useful in the RTV compositions have been described as polydiorganosiloxanes but such materials can also contain minor amounts, e.g., up to about 1.0 percent of monoorganosiloxane units such as monoalkylsiloxane units, e.g., monomethylsiloxane units and monophenylsiloxane units, and mono-t-alkoxysiloxane units, e.g., mono-t-butoxysiloxane units and mono-t-pentoxysiloxane units; and triorganosiloxane units, such as trialkylsiloxane units, e.g., trimethylsiloxane units, tributylsiloxane units and triphenylsiloxane units, and tri-t-alkoxysilane units, e.g., tri-t-butoxysiloxane units and tri-t-pentoxysiloxane units. Many of the tri-t-alkoxysilanes useful as part of the silanol chain-stopped materials are described and claimed in application Ser. No. 634,828 filed May 1, 1967, the disclosure of which is expressly incorporated herein by reference.

The silanol chain-stopped polydiorganosiloxanes useful in the RTV compositions can vary from thin fluids to viscous gums, depending upon the value of n and the nature of the particular organic groups represented by $R^8$ and $R^9$. Preferably, the silanol chain-stopped polydiorganosiloxane will have a viscosity in the range of about 100 centipoise to about 50,000 centipoise at 25° C.

The RTV compositions are prepared by mixing one or more of the imidatosilanes with the silanol chain-stopped polydiorganosiloxane. Since the imidatosilanes will hydrolyze upon contact with moisture, care should be exercised to exclude moisture during the addition of the imidatosilane to the silanol chain-stopped polydiorganosiloxane. Likewise, care should be taken that the mixture of the imidatosilane and the silanol chain-stopped polydiorganosiloxane is maintained under substantially anhydrous conditions if it is desired to store the mixture for an extended period of time prior to conversion of the material to the cured, solid, elastic silicone rubber state. On the other hand, if it is desired to permit the mixture to cure immediately upon addition of the imidatosilane to the polydiorganosiloxane, no special precautions are necessary and the two components can be admixed and placed in the form or shape in which it is desired for the composition to be cured.

The amount of the imidatosilane admixed with the silanol chain-stopped polydiorganosiloxane can vary within wide limits. However, for best results, it is preferred to add an excess of one mole of the imidatosilane per mole of silicon-bonded hydroxyl groups in the silanol chainstopped polydiorganosiloxanes. Satisfactory curing can be obtained, for example, with from 1.0 to 4 moles of the imidatosilane per mole of silicon-bonded hydroxyl groups in the polydiorganosiloxane. No particular benefit is derived from using more than 4 moles of the imidatosilane per mole of the polydiorganosiloxane. The temperature of the addition of the imidatosilane to the silanol chain-stopped polydiorganosiloxane is not critical, and a temperature from about 20° C to about 80° C is usually employed.

The RTV compositions exhibit improved properties in the cured state as compared to known RTV compositions, particularly in the areas of non-corrosion, thick section cure and adhesion to substrates. Improved adhesion to substrates such as concrete, glass, wood and aluminum is obtained with the present RTV compositions. Most importantly, the improved adhesion is achieved without the use of expensive and time-consuming primers. The RTV compositions can be used under environmental conditions where the use of certain known RTV compositions is not without possible harmful effects from corrosion. Finally, many of the RTV compositions give a more satisfactory cure of thick sections than is possible with known RTV compositions.

EXAMPLE 50

A suitable reaction vessel containing about 926 parts of toluene and about 174 parts of ethylacetimidate is charged with about 130 parts of dimethyldichlorosilane. The mixture is stirred for about 5 minutes at room temperature and about 202 parts of triethylamine are added. The mixture is heated at 80° C for 2 hours, cooled to 30° C and filtered to remove the amine hydrochloride. The filtrate is concentrated by evaporation to remove the toluene and is subjected to flash distillation to give 138 parts of dimethyl-bis-(ethylacetimidato)silane having a b.p. of 101° C at a pressure of 9 mm of mercury. The product imidatosilane is confirmed by NMR and IR.

Following substantially the same procedure as in Example 50 above and using the appropriate reactants, the following compounds of this invention are prepared.

EXAMPLE

COMPOUND

51. Diethyl-bis(ethylacetimidato)silane.
52. Dipropyl-bis(ethylacetimidato)silane.
53. Di-t-butyl-bis(ethylacetimidato)silane.
54. Diphenyl-bis(ethylacetimidato)silane.
55. Diethyl-bis(phenylacetimidato)silane.

The imidatosilanes of this invention wherein d and e are each 1 are useful as chain extenders for silanol-stopped diorganosiloxane fluids and as process aids for RTV compositions. A small amount of the dihydrocarbyl containing imidatosilanes, when added to RTV compositions, markedly reduce structuring of the rubber.

EXAMPLE 56

An RTV composition comprising about 44 parts of a silanol-stopped polydimethylsiloxane having a viscosity of 3,000 centipoises at 25° C and 56 parts of a silanol-stopped polydimethylsiloxane having a viscosity of 20,000 centipoises at 25° C is admixed with 1.5 parts of dimethyl-bis-(ethylacetimidato)silane and 0.08 part of dibutyl tin dilaurate, stirred for 30 minutes and heated to 60° C. A silazane treated silica filter, 28 parts, and 15 parts of a standard plasticizer are added to the mixture. Mixing is continued for an additional 2 hours at room temperature at which time 6 parts of methyl-tris(ethylacetimidato)silane is added as curing agent. The uncured composition is applied from an 8 oz. caulking cartridge under 90 psi at a rate of 43 grams/minute. The same composition without the dimethyl-bis(ethylacetimidato)silane is applied from an 8 oz. caulking cartridge under 90 psi at an application rate of only 3 grams/minute.

The imidates useful in the preparation of the imidatosilanes of this invention are well known in the art and can be prepared by several methods. One method comprises reacting a nitrile with an alcohol in the presence of an acid such as HCl and then treating the resulting salt with a base such as $K_2CO_3$ in a solvent such as methylene chloride in order to obtain the free base.

What I claim as new and desire to secure by Letters Patent of the United States is:

1. Compound of the formula:

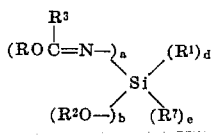

wherein $R^1$ and $R^7$ are each radicals of not more than 9 carbon atoms selected from the group consisting of hydrogen, hydrocarbyl, halohydrocarbyl and cyanoalkyl, R and $R^2$ are each organic radicals of not more than nine carbon atoms selected from the group consisting of hydrocarbyl, halohydrocarbyl, and alkoxyhydrocarbyl, $R^3$ is a radical of not more than nine carbon atoms selected from the group consisting of hydrogen, hydrocarbyl, and dialkylamino, a is an integer of 1 to 4, inclusive, b is an integer of 0 to 3, inclusive, d and e are each integers of 0 to 1, and the sum of a, b, d and e is 4.

2. Compound of claim 1 wherein R, $R^1$, $R^2$, $R^3$ and $R^7$ are alkyl.

3. Compound of claim 1 wherein R, $R^1$, $R^2$ and $R^3$ are alkyl, b is 1 and e is zero.

4. Compound of claim 1 wherein R, $R^1$ and $R^3$ are alkyl, and b and e are zero.

5. Compound of claim 1 wherein R and $R^1$ are alkyl, $R^3$ is dialkylamino, and b and e are zero.

6. Compound of claim 1 wherein R and $R^2$ are alkyl, $R^3$ is dialkylamino, $R^1$ is alkyl and e is zero.

7. Compound of claim 1 wherein R and $R^2$ are alkyl, $R^3$ is dimethylamino, $R^1$ is alkyl and e is zero.

8. Compound of claim 1 wherein $R^1$ and $R^3$ are methyl, R and $R^2$ are ethyl and e is zero.

9. Compound of claim 1 which is methyl-tris(ethyldimethylcyanimidato)silane.

10. Compound of the formula:

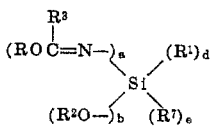

wherein R, $R^1$, $R^2$, $R^3$ and $R^7$ are alkyl radicals of 1 to 9 carbon atoms, a is an integer of 1 to 4, inclusive, b is an integer of 0 to 3, inclusive, d and e are each integers of 0 to 1, and the sum of a, b, d, and e is 4.

11. Compound of claim 10 which is methyl-tris(ethylacetimidato)silane.

12. Compound of claim 10 which is methyl-tris(isopropylpropionimidato)silane.

13. Compound of claim 10 which is methyl(ethoxy)-bis-(ethylacetimidato)silane.

14. Compound of claim 10 which is methyl(isopropoxy)-bis(isopropylpropionimidato)silane.

15. Compound of claim 10 which is methyl(diethoxy)-ethylacetimidatosilane.

16. Compound of claim 10 which is methyl(diisopropoxy)-isopropylpropionimidatosilane.

* * * * *